United States Patent [19]
Baas

[11] Patent Number: 5,197,053
[45] Date of Patent: Mar. 23, 1993

[54] COMPACT DISK READER

[75] Inventor: Dieter Baas, Kehl, Fed. Rep. of Germany

[73] Assignee: Deutsche Thomson-Brandt GmbH, Villingen-Schwenningen, Fed. Rep. of Germany

[21] Appl. No.: 684,137

[22] PCT Filed: Jun. 1, 1988

[86] PCT No.: PCT/EP88/00488
§ 371 Date: Feb. 9, 1989
§ 102(e) Date: Feb. 9, 1989

[87] PCT Pub. No.: WO88/09993
PCT Pub. Date: Dec. 15, 1988

Related U.S. Application Data

[63] Continuation of Ser. No. 328,078, Feb. 9, 1989, abandoned.

[30] Foreign Application Priority Data
Jun. 9, 1987 [DE] Fed. Rep. of Germany ....... 3719217

[51] Int. Cl.$^5$ ................................................ G11B 7/00
[52] U.S. Cl. ......................................... 369/32; 369/57
[58] Field of Search .................... 360/72.1, 69, 72.2; 369/32, 33, 41, 47, 57, 30

[56] References Cited

U.S. PATENT DOCUMENTS
4,667,314  5/1987  Iwashima ............................. 369/32
4,817,075  3/1989  Kikuchi et al. ...................... 369/47

Primary Examiner—Robert L. Richardson
Attorney, Agent, or Firm—Max Fogiel

[57] ABSTRACT

A compact-disk player for playing a compact disk that carries data in a plurality of program blocks recorded on the disk. The program blocks are dividable into sections by indices which are stored for each program block. Each index has starting and ending times that are also stored. Any index within any program block may be selected, and an optical scanner scans the compact disk to be played. The amount to be skipped by the optical scanner to arrive at a position that corresponds to the selected index, is calculated from the stored starting and ending times.

7 Claims, 3 Drawing Sheets

COMPACT DISK READER

The present application is a continuation of the parent application Ser. No. 328,078 filed Feb. 9, 1989 now abandoned.

BACKGROUND OF THE INVENTION

The invention concerns a compact-disk reader wherein the first index for the individual program blocks recorded on a compact disk is stored.

The article Zusammenstellen eines CD-Programms ("Compiling a CD Program"), pages 26-28, Funkschau 15 (Jul. 18, 1986) describes what data are recorded on a compact disk and how a compact-disk reader processes them.

Each compact disk has a table of contents of data that provide information about the number of program blocks recorded on the disk, their starting times, and the overall playing time of the disk. The individual program blocks are as a rule musical selections, although they can also represented spoken texts or soundtracks for films and slideshows. Although up to 99 program blocks can be recorded on one compact disk, disks of music usually contain nor more than 10 to 20 different selections.

The table of contents of a compact disk has the data format illustrated in FIG. 1. The first block, A0, contains the title of the first musical selection, the second block, A1, that of the last selection, and the third block, A2, the overall playing time. The following blocks, D1-Dn, contain the starting times of the n individual selections recorded on the disk. Blocks A0. A1, A2, and D1-Dn are combined into a group, in which the table of contents of the disk is completely stored.

Since the total amount of memory available on the disk for the table of contents is in the lead-in track and is completely occupied by several of these directly adjacent groups, the data relating to the table of contents of the disk are stored multiply redundantly.

When the disk is played, the starting points D1-Dn, which comprise most of the data stored in the table of contents when there are more than three selections, are employed to calculate the starting times of the individual selections.

As illustrated in FIG. 2, the disk's lead-in track ES is followed by a pause PE with a prescribed duration of two to three seconds. Pause PE is followed by the individual program blocks, the four selections B1, B2, B3, and B4 illustrated in FIG. 2 for example. The last program block, selection B4, is followed by a lead-out track AS. The individual program blocks can be separated by pauses of durations that are not standardized. Between the first program block B1 and the second program block B2 in FIG. 2 is a pause P1, and between second program block B2 and third program block B3 is a pause P2, whereas fourth program block B4 follows third program block B3 directly. Pause P1 can be longer for example than pause P2.

Each program block is identified with a number to differentiate it from the others. The number tells the compact-disk reader what program block its pick-up is scanning at any moment. Furthermore, each program block has at least one and no more than 99 indices that can be employed to divide the block into up to 99 sections of any length. The indices for one program block extend from 01 to 99 and from 00 to 99 when there is a pause between two blocks. The index 00 is always assigned to a pause.

In FIG. 2 for example first program block B1 has only one index, 01, second program block B2 is divided into three sections by indices 01, 02, and 03 and third program block B3 into two sections by indices 01 and 02, and fourth program block B4 also has only one index, 01.

The total disk-playing time from the end of lead-in track ES to the end of lead-out track AS is stored parallel. The playing time of the individual program block is similarly stored inside each block, starting with time $t=0$. Stored parallel with each pause between two program blocks is the length of the pause, beginning, however, with the length of the pause at the start of the pause and ending at the end of the pause with the value zero. At this point the time is counted backwards as with a countdown, and the following four items of information are accordingly available to the compact-disk reader at the very instant its beam of light is scanning a location within a program block:

the playing time elapsed between the end of lead-in track ES and the location in question, the time elapsed between the beginning of the program block and the location in question, the number of the program block, and the index assigned to the location in question.

If the scanning beam strikes a pause between two program blocks, the following three items of information are available:

the index 00, indicating a pause, the playing time elapsed between the end of lead-in track ES and the particular location in the pause, and how long the pause still has to go or, in other words, after how many seconds the next program block will begin.

The potential for dividing a program block into up to 99 indices a special advantage for longer musical selections or literary works. The compact-disk manufacturer can for example use the indices to specify the solos—piano solos or solos by a particular singer, arias, duets, or choruses in an opera. In works of literature they can indicate monologues or dialogues by particular persons for example.

SUMMARY OF THE INVENTION

The object of the present invention is to design a compact-disk reader that will allow the indices to be processed.

This object is attained in accordance with the invention in that the indices for the individual program blocks recorded on a compact disk can be stored along with their starting and ending times in a memory.

DESCRIPTION OF THE PREFERRED EMBODIMENTS

Figure 1:
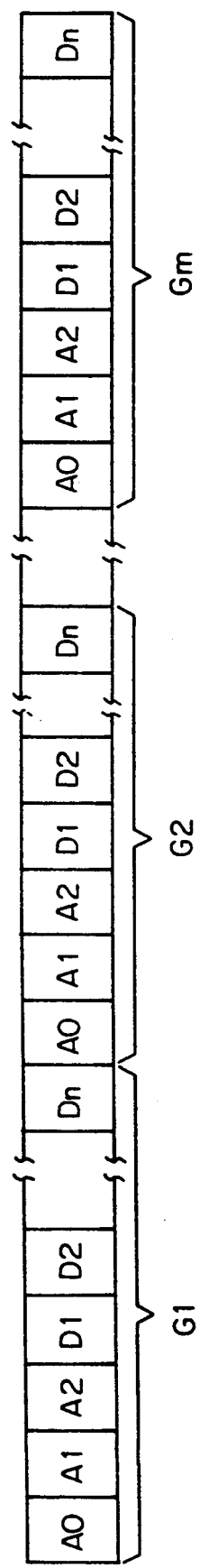
FIG. 1 is a schematic view of the table of contents of a compact disk.
Figure 2:
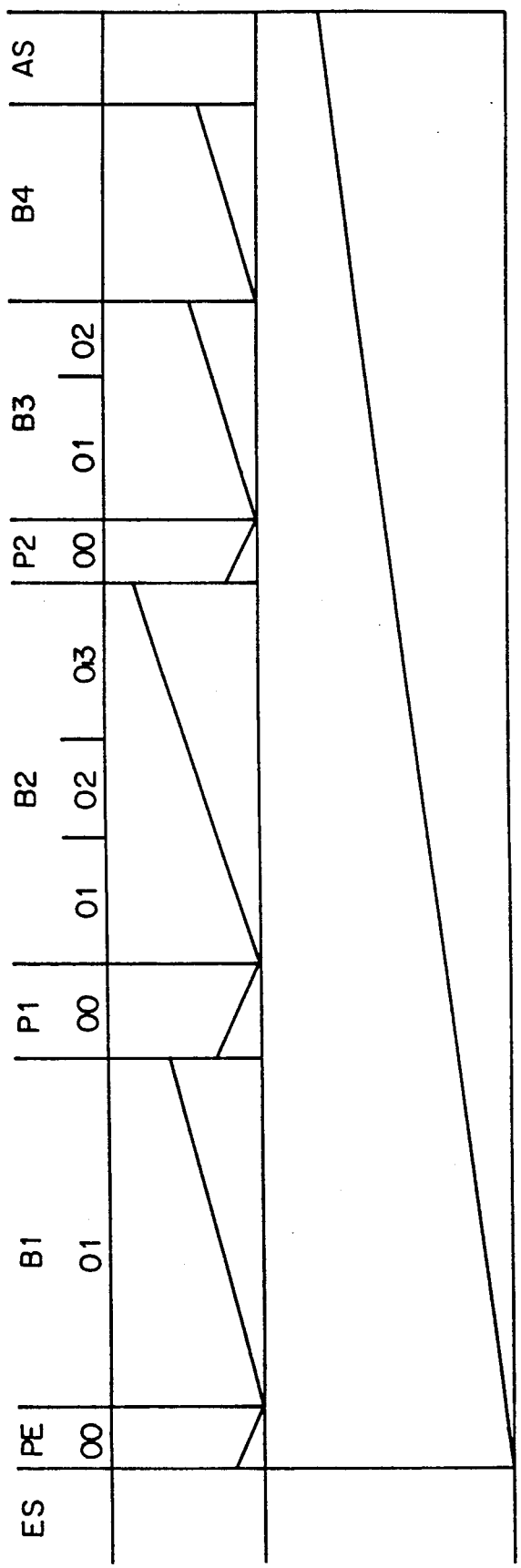
FIG. 2 is a schematic view of an arrangement of program blocks and indices.
Figure 3:
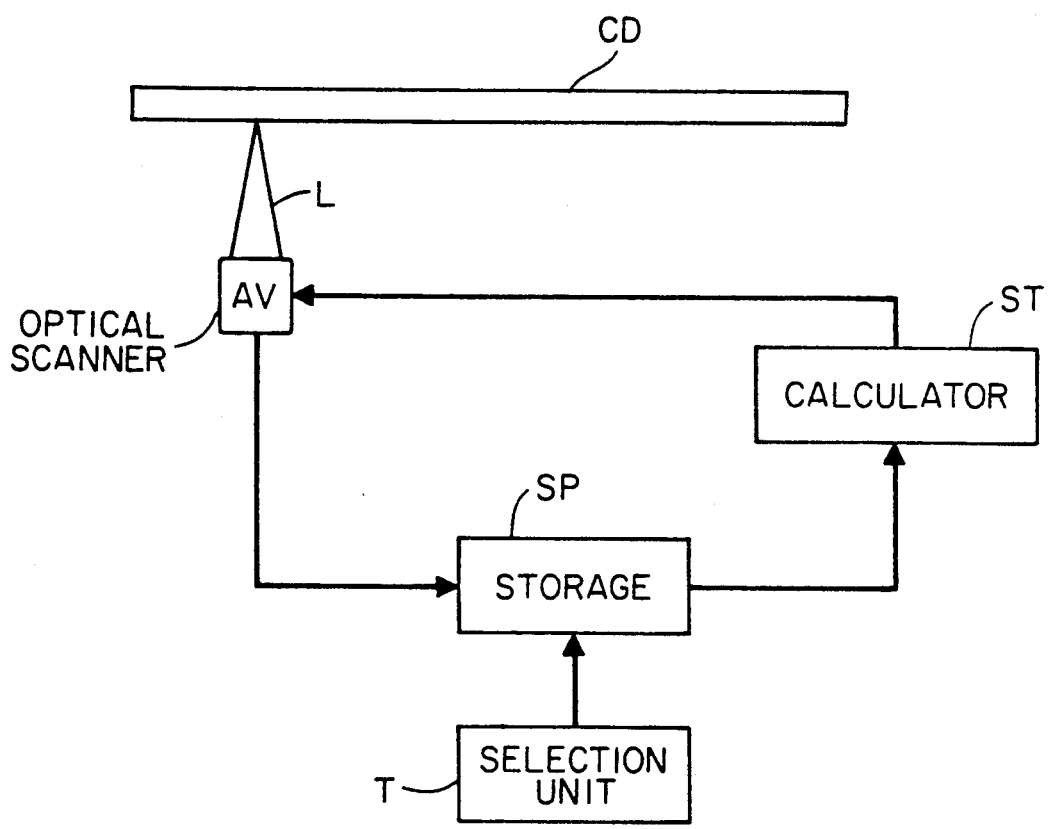
FIG. 3 is a schematic view and shows the essential elements, according to the present invention.

The invention will now be described with reference to one embodiment by way of example.

A compact disk CD is inserted and its table of contents conventionally read. The disk is then incrementally scanned by scanner AV in order to store in storage SP the indices of the individual program blocks, individual musical selections for example, along with their associated starting and ending times. It is accordingly possible for the listener to select by selection unit T and listen in sequence to particular passages in a selection, solos by a particular singer for example, assuming that the passages are characterized by indices on the disk.

One advantage of the invention is that the extent to which the reader's optical pick-up will skip forward to arrive at a particular selection or passage within a selection can be calculated by calculator ST from the starting and ending times of the indices, as is possible with the data stored in the table of contents, because the table lacks precisely those starting and ending times, as it does the lengths of the individual pauses between the selections. When, on the other hand, the lengths of the pauses are known in that they have, as in accordance with the invention, been calculated from the starting and ending times of the indices, the access times for desired selections will be decreased. Furthermore, the remaining playing time for a selection or programmed sequence that is being played at any moment can be displayed more precisely. The remaining playing time and the overall playing time of a currently playing index can also be displayed.

In another embodiment of the invention the indices and their associated starting and ending times are automatically stored in a memory while the compact disk is being played. Of particular advantage is a combination of the first and second embodiments that allows the listener either to store the indices and their starting and ending times first or to begin listening immediately.

In a fourth embodiment of the invention the ending time of lead-in track ES is stored. This measure decreases the access times because the length of lead-in track ES is not standardized and because no time zero must be assigned to its beginning. The lead-in track can for example start at time 12 seconds and end at time 50 seconds, the stored ending time.

In a fifth embodiment of the invention the indices and starting and ending times of several compact disks can be stored and characterized disk-by-disk in a memory.

It is of particular advantage for this purpose to provide a resident memory so that the stored indices, their starting and ending times, and the lead-in track ending time will not be erased when the reader is turned off, but will be immediately available when it is turned on again.

I claim:

1. A compact-disk player for playing a compact disk carrying data in a plurality of program blocks recorded on said disk, said program blocks being dividable into sections by indices, comprising: storage means for storing all indices of each program block, each of said indices having starting and ending times; said storage means also storing said starting and ending times; means for selecting any index within any program block; an optical scanner for scanning a compact-disk to be played; and means for calculating an amount to be skipped by said optical scanner dependent on the index selected and from stored starting and ending times of selected indices upon selecting a desired index within a desired program block, storing said indices and calculating said amount to be skipped by said optical scanner providing substantially rapid and precise skipping from one program block to another selected program block with predetermined index.

2. A compact-disk player as defined in claim 1, wherein said compact disk has a lead-in track with an ending time, said ending time of said lead-in track being stored also in said storage means.

3. A compact-disk player as defined in claim 1, wherein indices of individual program blocks as well as respective starting and ending times are stored in said storage means after insertion of a compact disk in said player.

4. A compact-disk player as defined in claim 1, wherein indices of individual program blocks and respective starting and ending times are stored in said storage means while a compact disk is being played.

5. A compact-disk player as defined in claim 1, wherein indices with respective starting and ending times of a plurality of compact disks are stored in said storage means together with identification for each compact disk.

6. A compact disk player as defined in claim 1, wherein indices with respective starting and ending times are stored in said storage means and remain stored in said storage means after switching off said compact-disk player.

7. A compact-disk player for playing a compact disk carrying data in a plurality of program blocks recorded on said disk, said program blocks being dividable into sections by indices, comprising: storage means for storing all indices of each program block, each of said indices having starting and ending times; said storage means also storing said starting and ending times; means for selecting any index within any program block; an optical scanner for scanning a compact-disk to be played; and means for calculating an amount to be skipped by said optical scanner dependent on the index selected and from stored starting and ending times of selected indices upon selecting a desired index within a desired program block; said compact disk having a lead-in track with an ending time, said ending time of said lead-in track being stored in said storage means after insertion of a compact disk; indices of individual program blocks together with respective starting and ending times being stored in said storage means after insertion of a compact disk; said storage means retaining said indices and respective starting and ending times after switching off said compact-disk player, storing said indices and calculating said amount to be skipped by said optical scanner providing substantially rapid and precise skipping from one program block to another selected program block with predetermined index.

* * * * *